United States Patent
Knowler et al.

(10) Patent No.: US 11,582,278 B2
(45) Date of Patent: Feb. 14, 2023

(54) CONTENT PLAYER PERFORMANCE DETECTION

(71) Applicant: DAZN LIMITED, Feltham (GB)

(72) Inventors: James E. Knowler, Croydon (GB); Rafal Kobylko, Rybnik (PL); Jakub Gert, Tychy (PL); Amir Arshadnejad, London (GB); Mark Hewis, London (GB); Patrick Kunka, London (GB); Luca Mezzalira, London (GB)

(73) Assignee: DAZN LIMITED, Feltham (GB)

( * ) Notice: Subject to any disclaimer, the term of this patent is extended or adjusted under 35 U.S.C. 154(b) by 0 days.

(21) Appl. No.: 16/987,016

(22) Filed: Aug. 6, 2020

(65) Prior Publication Data

US 2021/0044641 A1 Feb. 11, 2021

Related U.S. Application Data (60) Provisional application No. 62/885,018, filed on Aug. 9, 2019.

(51) Int. Cl.
*H04L 65/612* (2022.01)
*H04L 67/02* (2022.01)
*H04L 67/568* (2022.01)

(52) U.S. Cl.
CPC ............ *H04L 65/612* (2022.05); *H04L 67/02* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 9,819,566 B1 | 11/2017 | Ganjam et al. | |
| 2005/0204052 A1* | 9/2005 | Wang | H04L 47/10 709/231 |
| 2010/0124275 A1* | 5/2010 | Yeh | H04N 21/6379 375/240.07 |
| 2013/0250786 A1* | 9/2013 | Balasaygun | H04L 41/5032 370/252 |
| 2014/0059388 A1* | 2/2014 | Patiev | G06F 11/0781 714/37 |
| 2014/0189143 A1* | 7/2014 | Muhlestein | H04L 65/4084 709/231 |
| 2015/0128162 A1 | 5/2015 | Ionescu | |

(Continued)

OTHER PUBLICATIONS

Invitation to Pay Additional Fees and Partial Search Report for International Application No. PCT/EP2020/072300 dated Nov. 19, 2020, 16 pages.

*Primary Examiner* — Scott B Christensen
(74) *Attorney, Agent, or Firm* — Dorsey & Whitney LLP (57) ABSTRACT

A method for monitoring and correcting playback performance for content player. The method includes detecting a content player request from a media player on a user device, the content player request corresponding to a content item request from a server, generating a playback identifier including data corresponding to the content item, detecting one or more playback events occurring during playback of the content by the content player, generating one or more playback packets including the playback identifier, a packet identifier, and the one or more playback events, and transmitting the one or more playback packets to a server.

20 Claims, 4 Drawing Sheets

(56) References Cited

U.S. PATENT DOCUMENTS

2016/0182587 A1* 6/2016 Annamraju ............. H04L 47/32
　　　　　　　　　　　　　　　　　　　　　　709/219
2017/0105038 A1* 4/2017 Subramanya .......... G11B 27/36
2017/0250882 A1　　 8/2017 Kellicker

* cited by examiner

CONTENT PLAYER PERFORMANCE DETECTION

CROSS REFERENCE TO RELATED APPLICATIONS

The present application claims priority to U.S. provisional application No. 62/885,018 filed on 9 Aug. 2019 entitled "Content Player Performance Detection," which incorporated by reference herein for all purposes.

FIELD

The present disclosure relates generally to content streaming and playback on computing devices.

BACKGROUND

Many consumers receive content and other media from sources other than conventional over the air radio waves and cable providers. In particular, much of the content available over the Internet is "streamed" to user devices from one or more content servers, such as a server in a content delivery network (CDN). With content streaming, the content file is divided into fragments or packets and then transmitted to the user device over a network. As bandwidth or network issues arise, either on the client side or server side, fragments can stall out, fail, or the like, causing omissions in the content and/or failure of the content to display completely. Additionally, different hardware devices utilize onboard media players that are used to stream or view content. For content providers, playback quality and consistency are important to the user experience and buffering, timeouts, crashes, and other issues during playback can result in poor user experience. However, many current media players do not track playback events or other related data, making it difficult for content providers to troubleshoot issues and manage server demand.

SUMMARY

In one embodiment, a method for monitoring and correcting playback performance for content players. The method includes detecting a content play request from a media player on a user device, the content player request corresponding to a content item request from a server, generating a playback identifier including data corresponding to the content item, detecting one or more playback events occurring during playback of the content by the content player, generating one or more playback packets including the playback identifier, a packet identifier, and the one or more playback events, and transmitting the one or more playback packets to a server.

The method may include determining a player state of the content player where the one or more playback packets include the determined player state.

The method may include that generating one or more playback packets includes determining that at least one of a threshold of playback events has occurred or a time interval has been reached and generating a text file corresponding to the playback identifier, packet identifier, and data corresponding to all playback events occurring since a start of the content playback or a last generated playback packet.

The method may include that one or more playback packets are utilized by the server to determine a user experience corresponding to a user associated with the user device.

The method may include a reporter module in communication with the content player that generates the one or more playback packets.

The method may include that one or more of the playback events comprise one or more of a state change with the content player, a playback control change of the content player, an error with playback of the content by the content player, a change of a server providing the content to the user device, a playback metric, a connection type for a connection of the user device to a network, or a connection strength for a connection of the user device to a network.

The method may include that transmitting the one or more playback packets to the server comprises determining that a connection between the user device and the server has sufficient bandwidth and transmitting the one or more playback packets to the server based on sufficient bandwidth.

The method may include that the content item request is transmitted to a first serer and the playback packets are transmitted to a second server.

In an embodiment, a content tracking system to detect content play issues is disclosed. The content tracking system includes a content player in electronic communication with a content delivery server and a reporter module in electronic communication with the content player and a control server. The reporter module generates a session identifier in response to the content player requesting a first content item for display, generates a first set of playback events in response to one or more playback events occurring during a first time period of play of the first content item, generates a first playback identifier corresponding to the first time period, and transmits a first playback packet to the server, the first playback packet including the session identifier, the first set of playback events, and the first playback identifier.

The system may include that the reporter module determines a state of the content player at a beginning of the first time period and includes the state in the first playback packet.

The system may include that the reporter module determines a session metadata describing the first content item and a user associated with the content player, where the first playback packet includes the session metadata.

The system may include that the reporter module generates a second set of playback events in response to one or more playback events occurring during a second time period of the first content item, generates a second playback identifier corresponding to the second time period, and transmits a second playback packet to the server, the second playback packet including the session identifier, the second set of playback events, and the second playback identifier.

The system may include that the first set of playback events includes one or more of a state change with the content player, a playback control change of the content player, an error with playback of the content by the content player, a change of a server providing the content to the content player, a playback metric, a connection type for a connection of the user device to a network, or a connection strength for a connection of the user device to a network.

The system may include that the content player is an adaptive bitrate player.

The system may include that the content player is independent of the reporter module.

In an embodiment a method for tracking content playback performance across a system is disclosed. The method includes receiving a first set of playback packets corresponding to playback of a first content asset on a first client device, receiving a second set of playback packets corresponding to playback of the first content asset on a second client device, analyzing the first set of playback packets and the second set of playback packets to determine server load on a first content delivery network server hosting the first content asset, and based on the analysis, instructing a third client device to retrieve the first content asset on a second content delivery network server.

The method may include that the playback packets in the first set of playback packets include a session identifier corresponding to the first content asset, a playback index corresponding to an order of the playback packets within the first set of playback packets, and a plurality of player events detected during playback of the first content asset.

The method may include that the first set of playback packets are transmitted from a reporter module on the first client device, where the reporter module is separate from a first content player on the first client device that presents the first content asset.

In another embodiment, a computer readable medium that includes instructions is disclosed. The instructions when executed cause a processor to perform any of the methods described above. The computer readable medium may be non-tangle.

In yet another embodiment, a computing device is disclosed. The computing device may comprise one or more processing elements and one or more memory components. The computing device is configured to perform the method of any of the methods described above.

DETAILED DESCRIPTION

The present disclosure relates generally to a system to reduce content delivery and display issues related to streamed content, by capturing and analyzing player and playback metrics. In one embodiment, a reporter module generates playback packets at intervals and provides the playback packets to a cloud server, allowing the server to monitor playback issues in real time across a network of devices. In some instances the playback packets include unique identifiers corresponding to the playback session (e.g., viewer id, asset id, start time, device id), as well as playback data such, as player state and detected events that occurred during the streaming session, as well as identifiers, such as index values. The data contained in the playback packets is determined automatically from the content player and generated by the reporter (e.g., packet identifiers) and allows analytics to be executed to assess playback issues, such as buffering, CDN loading, trend identification, and the like.

The playback packets are transmitted to the cloud at intervals, which may be time based (e.g., every 1-2 seconds) and/or data or event based (e.g., after a threshold value of events has been detected). The reporting schedule may be variable with event thresholds to allow the system to more quickly identify problems, while still receiving baseline regular data. Additionally, the playback packets may be selectively transmitted based on available bandwidth and queue storage. For example, in instances where the content player is streaming data with low bandwidth availability, the reporter may select to not transmit playback packets at regular intervals, helping to increase available bandwidth for playback. As another example, playback packets may be stored or queued in a local cache memory as generated and the system may be selected to store a threshold number of playback packets, deleting oldest packets (e.g., first in first out order), as memory capacity is reached.

The playback packets detect raw data from the content player, which helps to prevent modification of the data by the content player, reduces data loss from assumptions from the player, ensures uniform application of metric analysis across various content players and devices, and allows quick identification and correction of content provision issues (e.g., CDN overloading, and the like).

Figure 1:
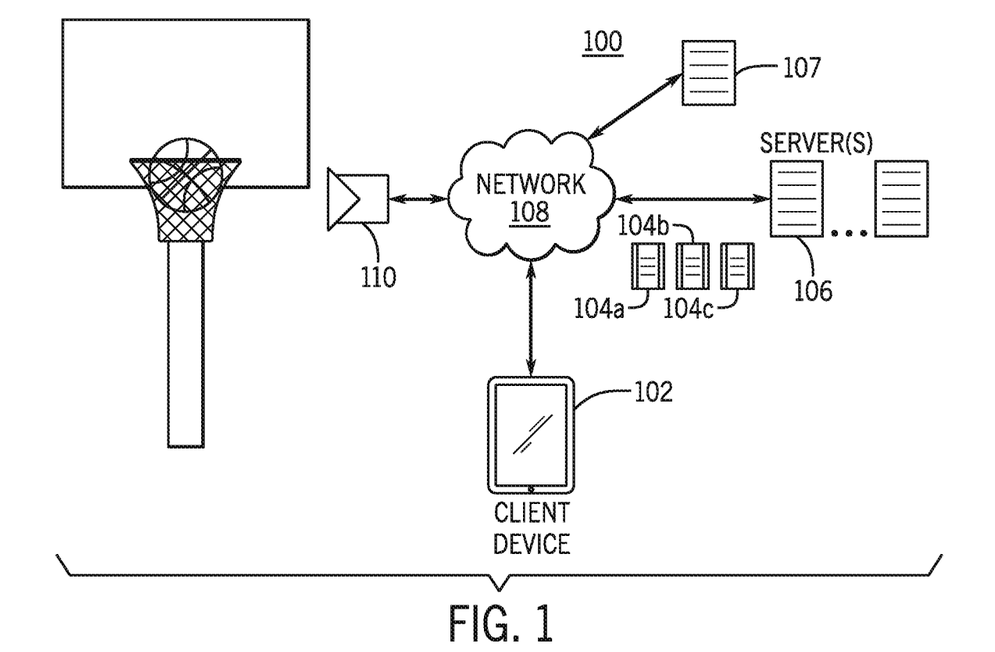
FIG. 1 illustrates a system diagram of a system for content delivery including a module to dynamically capture content performance and playback events.

Turning to the figures, FIG. 1 illustrates a system 100 for capturing and improving content playback performance. The system 100 may include one or more client devices 102, one or more servers 106, 107, one or more content sources 110, all of which may be in communication via a network 108. The client device 102 may include one or more computing devices or display devices, such as, but not limited to, television, smartphone, gaming or content console, set top box, tablet, laptop, and the like. Generally the client device 102 will include a display (or be in communication with a display) and an onboard content player, such as a media or video player (e.g., Shaka player, ExoPlayer, AVPlayer, and the like), that receives and converts content data into visual images to be displayed to the user. The type of client device and content player may be varied as desired and the system 100 may generally support multiple client devices accessing the same content.

The content servers 106 host content that is transmitted to the client device 102 via the network 108, that may be received from the content sources 110, other servers, or the like. The content servers 106 may be distributed, virtual machines, or standalone devices. In some embodiments, the content servers 106 may be one more nodes of a content distribution network (CDN), and include one or more proxy servers and corresponding data centers. The content servers 106 are configured to send data representative of the content to the client device 102.

In the example of video content, the content severs 106 may optionally encode and transmit a media file into multiple fragments and an index file, as well as two or more quality versions of the fragments. For example, for a first fragment representing 10 frames of content, the server 106 may prepare a low quality version of the first fragment, a medium quality version of the first fragment, and a high quality version of the first fragment. The different qualities are different bitrates corresponding to higher or lower resolution, as an example. Additionally, depending on the type of content, the files corresponding to the content may include video fragments and audio fragments. A manifest file including metadata corresponding to the types of bitrates available (e.g., types of fragments, low, medium, high) and location on the server. It should be noted that certain content files may include multiple manifest files. For example, with live playback for content, the manifest will be dynamically generated and need to be updated as the playback continues.

With reference to FIG. 1, the server 106 may store content files, such as a first fragment file type 104a, a second fragment file type 104b, and a third fragment file type 104c, where the content represented is the same, but the bitrate between the three is different, corresponding to low, medium, and high resolutions, respectively.

In some embodiments, the system 100 may include different types of servers, such as content servers 106 and control or system servers 107 that receive playback data from the client devices 102 and help to track and correct content playback across the system 100 or platform. In these embodiments, the different servers 106, 107, may or may not be in communication with one another. For example, the content servers 106 may interface directly with the client device 102 to transmit content, whereas the control servers 107 may be in communication with the client device 102 to receive and analyze playback metrics. In other embodiments, the content and control servers may be combined together, either as singular devices, cloud compute, and/or distributed or virtual machines.

The network 108 is substantially any type of data transmission platform, such as a wireless or wired communication system. In many embodiments, the network 108 is a combination of one or more networks, such as local area networks, wide area networks, and the like, e.g., the Internet.

The content sources 110 may be cameras or other capture devices that may be used to transmit content to the severs 106, such as instances of live events, where the content may not be already stored on the server 106. For example, as shown in FIG. 1, the content source 110 is a camera capturing a live action event, such as a sporting event, a live play, awards show, news, or other action as it occurs. The content source 110, which in this case is a camera including image sensors, records the event, and in real time transmits the data corresponding to the captured event (e.g., live content) to the servers 106 via the network 108. At the severs 106 or at the content source 110, the content 104 is encoded into the multiple resolutions and bitrates.

Figure 2:
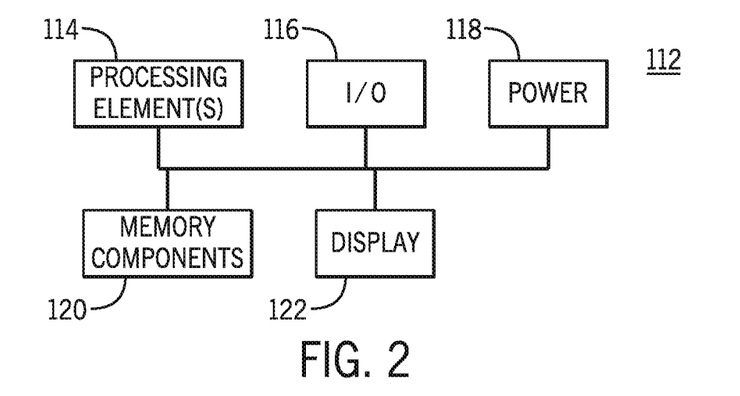
FIG. 2 is a simplified block diagram of computing devices within the system.

FIG. 2 illustrates a simplified block diagram of a computing device, such as the client device 102, the servers 106, 107, and/or content sources 110. The computing devices may include one or more of one or more processing elements 114, an input/output interface 116, a power source 118, one or more memory components 120, and optionally a display 122, each of which may be in communication with one another such as through one or more system buses, wireless means, traces, or the like.

The one or more processing elements 114 are electronic devices capable of processing, receiving, and/or transmitting instructions and data. The processing elements 114 may be a microprocessor, processor, microcomputer, graphical processing unit, or a combination of multiple processing elements. For example, a first processing element may control a first set of components of the computing device and the second processing element may control a second set of computing devices, where the first and second processing elements may or may not be in communication with one another. Additionally the processing elements may be configured to execute one or more instructions in parallel.

The input/output interface 116 receives and transmits data to and from the network 108. The input/output interface 116 may transmit and send data to the network 108, as well as other computing devices. The input/output interface 116 may be configured to send and receive HTTP requests.

The power source 118 provides power to various components of the computing device. The power source 118 may include one or more rechargeable, disposable, or hardwire sources, e.g., batteries, power cords, or the like.

The memory 120 stores electronic data, such as the content 104a, 104b, 104c, that may be utilized by the computing devices. The memory 120 may include electrical data or content, such as processor instructions (software code), audio files, video files, document files, and the like. The memory 120 may include multiple components, such as, but not limited to, non-volatile storage, a magnetic storage medium, optical storage medium, magneto-optical storage medium, read only memory, random access memory, erasable programmable memory, flash memory, or a combination of one or more types of memory components. In many embodiments, the servers 106, 107 may have a larger memory capacity than the client devices 102.

In some instances, the computing devices, such as the client device 102, may include a display 122. The display 112 provides a visual output for the computing devices and may be varied as needed based on the device. The display 112 may include a liquid crystal display screen, light emitting diode screen, plasma screen, and the like.

Figure 3:
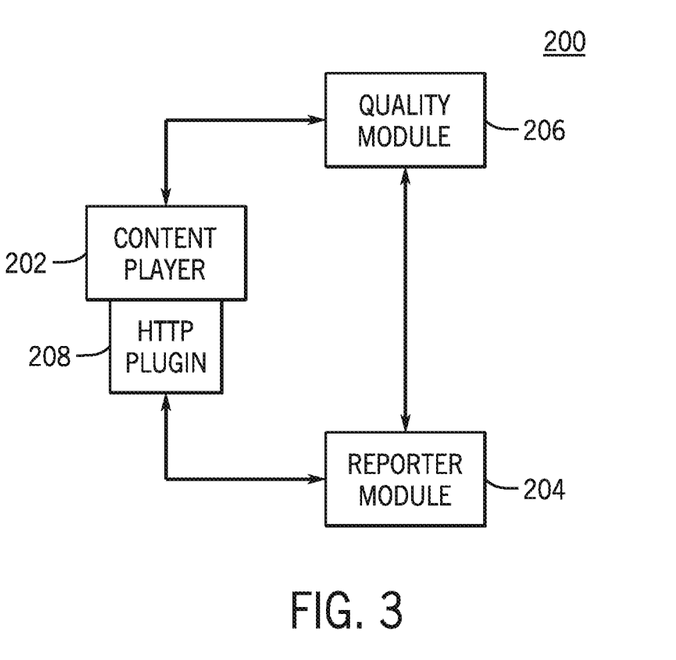
FIG. 3 is a block diagram of the capturing module including a reporter module for detecting and capturing playback packets.

FIG. 3 illustrates a block diagram of an illustrative architecture for a tracking or content module 200 on a client device 102 for detecting, aggregating, and transmitting playback packets. In some embodiments, the content module 200 may be implemented as an application executing on the device that utilizes the onboard content player of the device. As shown in FIG. 3, the tracking module 200 includes a reporter module 204 that interfaces with a content player 202, such as a native, onboard, or other installed player on the client device 102. The content player 202 may be an adaptive bitrate (ABR) player that allows the player to automatically adjust and display different file resolutions or any other type of player to playback content. The tracking module 200 may include one or more application program interfaces (APIs) or plugins that are able to transmit and receive data and instructions from the player 202, such as an HTTP plugin 208. The tracking module 200 also may include a reporter module 204 and a quality module 206.

The quality module 206 may be utilized to dynamically select quality levels for content fragment downloads to be required by the content player 202 from the content server 106. An example of a quality module 206 or heuristic that is implemented is described in U.S. Provisional Application No. 62/877,012 titled "Dynamic Behavior Modification for Content Download and Playback," filed on Jul. 22, 2019 and incorporated by reference herein for all purposes.

The reporter module 204 collects various player and playback related data, generates playback packets to be transmitted to the server 107. The reporter or reporter module 204 may transmit the playback packets in the form of HTTP requests via the HTTP plugin 208 or by other transmission methods as needed. In many implementations, the reporter module 204 is independent of the content player 202, allowing data to be collected by the reporter module 204 that is "raw data" from the content player 202, rather than data that has been analyzed or modified in some manner by the content player 202.

Figure 4A:
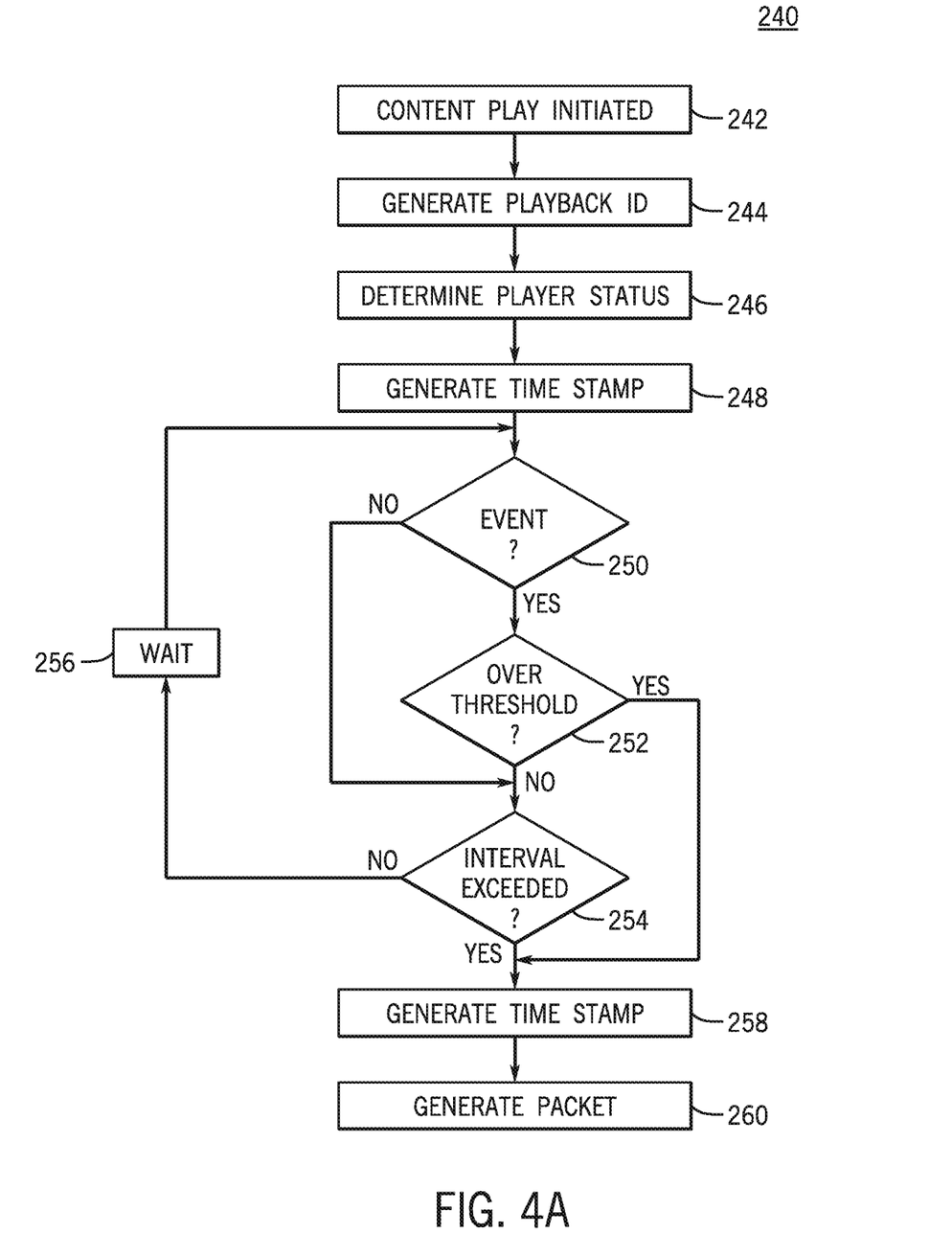
FIG. 4A is a flow chart illustrating a method of utilizing the capturing module to generate playback packets.
Figure 4B:
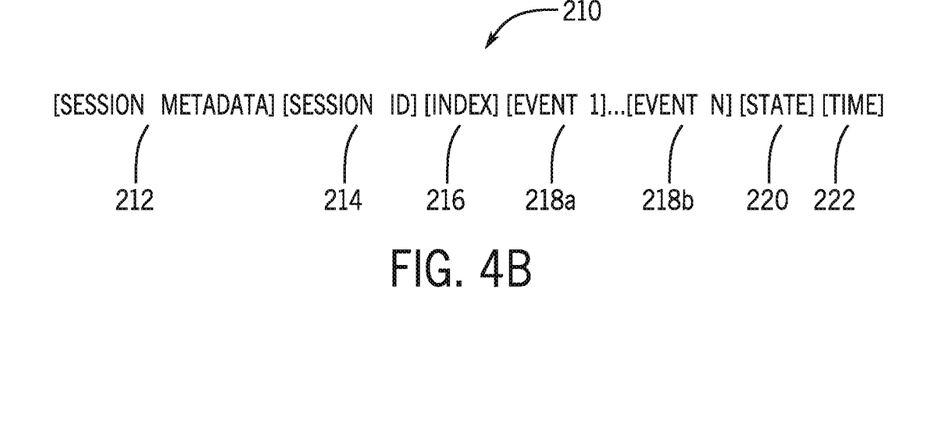
FIG. 4B is an example of a playback packet generated by the method of FIG. 4A.

FIG. 4A is a flow chart illustrating a method 240 of utilizing the content module 200 and reporter module 204 to detect, capture, generate, and transmit playback packets to the server 107. FIG. 4B is an example of a playback packet 210 generated by the method 240. With reference to FIGS. 4A and 4B, the method 240 may begin with operation 242 and content play is initiated by the content player 202. For example, the user may select a content item (e.g., uniform resource link), to stream a video, live broadcast, or other media item or content asset, to be viewed on his or her client device 102. As a content item is accessed, the reporter module 204 may generate a playback session that extends through when the content item terminates or the user stops watching (e.g., hits stop or closes out the application).

As the content player 202 begins to request and play the selected content, the method 240 proceeds to operation 244 and a playback identifier, such as a playback id 214 is generated. For example, the playback id 214 may include identifying information to assist the server 107 in distinguishing the playback data in the playback packet 210 from other playback instances. The playback or session id 214 may include unique identifiers to allow the server 107 to distinguish from instances where the user may play the same content item or asset at the same time on multiple devices. In one example, the playback or session id 214 may include a viewer or user ID (e.g., user name, account, user id, and the like) that is tied to a particular user, which may be based on the content application 200 (e.g., a subscription or login account), and/or the client device 102 (e.g., a registered owner or the like). The playback id 214 may also include an asset id, which may represent the content item accessed, such as a URL, title, name, identifier, or the like, a start time indicating when the content item began playback, and optionally a device identifier that identifies the device the user is access the content on (e.g., serial number, operating software information, etc.).

In addition to the playback id 214, session metadata 212 may also be determined at initialization of the content by the content player 202. Session metadata 212 may similar or the same information as in the playback id 214 (e.g., content id, viewer id), but may also include other information, such as, but not limited to, platform id (e.g. device brand name, model number, or category type such as mobile or set top), user agent, app framework, browser name, application version, content player 202 name or version, steaming protocol (e.g., Dash, SmoothStreaming, HLS), digital rights management vendor (e.g., PlayReady, Winevine, Fairplay), internet protocol address, and/or territory (e.g., Japan, Germany, USA, etc.). The session metadata 212 may be variable depending on the desired analytics and tracking done by the server 107.

With reference again to FIG. 4A, after operation 244 and the playback ID 214 is generated, the method 240 proceeds to operation 246 and the content player status or state information 220 is determined. For example, the reporter module 204 may request a state of the content player 202 or retrieve a state of the content player 202 regarding the playback of the content item. For example, the reporter module 204 may interrogate the content player 202 through an API, by listening to events that the player 202 may emit when changing state, and/or creating an instance of the reporter module 204 before creating an instance of the content player 202 within the playback application. In the last example, the reporter module 204 may have a registered interest in the player's state events, such that the reporter module 204 may be provided all state events from the player, including initial ready or idle events before playback begins. Examples of player states include, loading, loaded, playing, buffering, paused, ended, and correlate to the current mode or condition of the content player 202. The determined player state or tsate information 220 may be selected from a list of options or may be generated by the content player 202.

The method 240 may then proceed to operation 248 and a timestamp is captured. The timestamp may be in a variety of formats, but may be determined using a monotonic clock on the client device 102. As one example, the timestamp may be in milliseconds and include Unix Time (UTC), with the number of milliseconds elapsed since a particular date (e.g., Jan. 1, 1970) in the format of 00:00:00 UTC. However many other timestamp options are envisioned.

After operation 248, the method 240 may proceed to operation 250 and the reporter module 204 determines whether any player events or event data 218a, 218b have occurred. Playback events one or more of include state changes with the player (e.g., loading, loaded, playing, buffering, paused, ended), playback control changes (e.g., load, play, pause, seek), errors with playback, CDN rotations (e.g., changes in CDN or content server 106 providing the content, which may include the reason why the CDN rotation was triggered and/or the CDN that the player will be utilizing next), playback metrics (e.g., events generated by probing the player for its current internal state at a selected time interval, such as every 500 ms, which may include playback position, buffered duration for video, buffered duration for audio, and/or bandwidth estimate), connection type (e.g., event suitable to mobile devices where it reports changes in the network connection, such a switch between wired, WiFi, 3G or 4G cellular networks), connection strength (e.g., event that tracks changes in connection strength at selected time intervals or where changes in strength pass a threshold value or delta). The event data 218a, 218b may include listings of events that occurred, e.g., change in state or change in network, and/or may include additional detail or data related to the event to provide more description, e.g., change in network from WiFi to 3G cellular. In some instances, there may be various categories of playback events captured, requests made from the playback application to the content player (e.g., open, play, pause, stop), reporting received from an adaptive bit rate player or quality module (e.g., metrics, current bitrate, playback state, heuristic state, CDN rotation), and reporting by the playback application and user interface (e.g., presence of UI buffering indicator which may miss micro-buffering events if the UI debounces/filters the events).

If a playback event has occurred, the method 240 proceeds to operation 250 and the reporter module 204 determines whether the event number if over an event threshold, such as over a value between 800 to 2000 and preferably 1000 events (or other numeric threshold as desired). If the event threshold has been passed, method 240 proceeds directly to operation 258 so that a playback packet can be generated. This allows the reporter module 204 to generate additional playback packets that scale with changes in the content playback, so that a more refined or granule assessment of the data can be done and the data can be evaluated more quickly (i.e., the playback packets are sent before the typical interval). In this manner, the server 107 may able to detect issues faster.

If the events have not exceeded the event threshold, method 240 proceeds to operation 254 and the reporter module 204 determines whether the time interval for the playback packets has been exceeded. For example, in some instances, the system may use both time and event thresholds in order to generate playback packets, such that the packets may be produced regularly and on-demand as issues arise. In some instances, the playback timed interval may range between 20 to 70 seconds and preferably 60 seconds, where the longer the interval, the more the load on the client device and server may be reduced as fewer separate requests may be needed. However, in instances where real time feedback is desired, the interval may be much shorter, e.g., 1 second, allowing the playback of the player to be instantly reviewed and tracked, allowing a faster response time for identified errors. If the interval has not been reached, the method 240 may optionally proceed to a wait operation 256 and then proceed back to operation 250 where events are monitored and detected.

When either the time or event thresholds have been reached, the method 240 proceeds to operation 258 and a timestamp may be generated. Then, the method 240 proceeds to operation 260 and a playback packet 210 is created. With reference to FIG. 4B, the playback packet 210 may include session ID 214, an index 216 reflecting an order identifier for the packet 210 (e.g., 1, 2, etc.) corresponding to the number of prepared packets for the session, event data 218*a*, 218*b*, content player status or state information 220, and time information 222 (e.g., timestamps corresponding to start and/or end times captured by the timestamp operations 248, 258). Additionally, in some instances, such as when the playback packet is the first for a particular playback session, the playback packet 210 may also include session metadata 212 describing additional data that will apply to all playback packets 210 in the session.

The index 216 may be an incrementing integer that provides information regarding the order of playback packets as received on the server 107 side, to allow reconstruction of an stream of content playback events. The index 216 also can be used by the server 107 to identify that select playback packets are missing or omitted.

Figure 5:
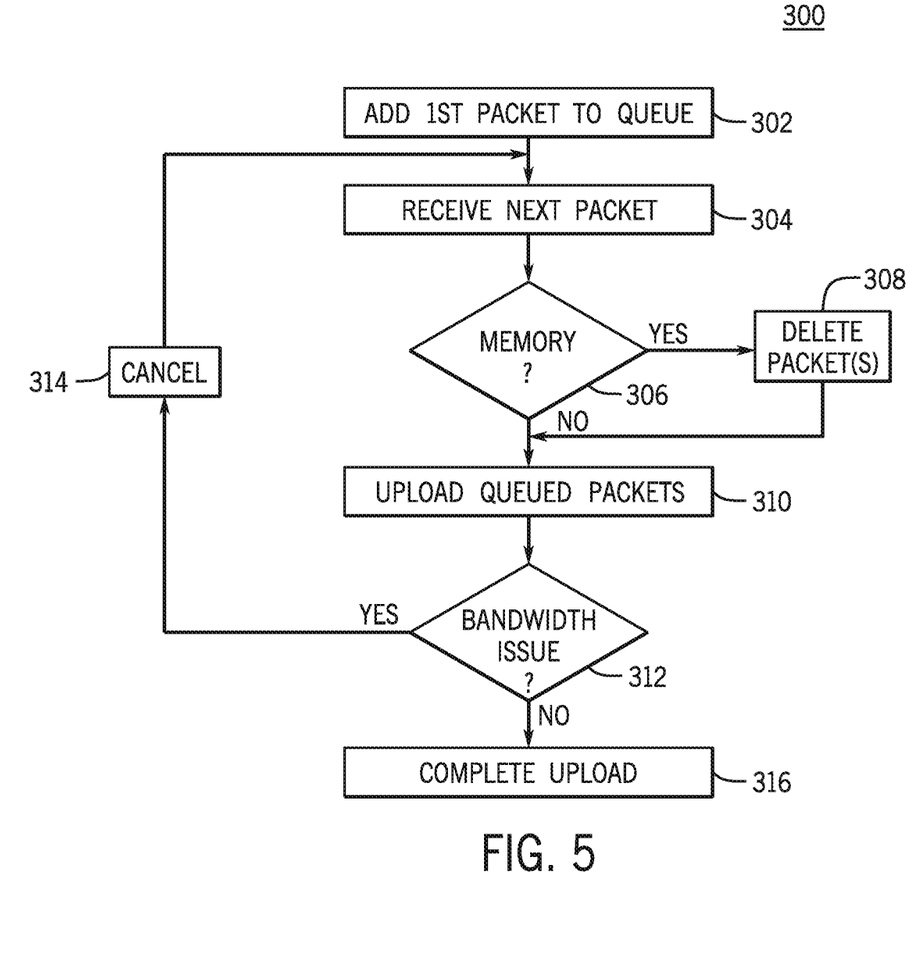
FIG. 5 is a flow chart illustrating a method of transmitting playback packets to a server.

FIG. 5 illustrates a flow chart of a method 300 that may be used to transmit and store playback packets 210 to the control or system sever 107. The method 300 may begin with operation 302 and a first generated playback packet 210, such as one generated in operation 260 in FIG. 4A, is added to a packet queue. The first playback packet may include the session metadata 212. The packet queue may be part of a memory or local cache on the memory component of the client device 102.

Once the first playback packet 210 has been added, the method 300 proceeds to operation 304 and additional of next playback packets are received by the memory 120. As packets are received, the method 300 proceeds to operation 306 and the reporter module 204 determines whether there is sufficient memory availability for the newly arrived playback packets 210. For example, the local cache may have volume restrictions based on data volume, which prevent additional receipt of data over certain levels. As another example, the cache may be set up to receive a particular number of packets, e.g., 10 to 50 packets, and in many embodiments 10 packets, and any additional packets received may be determined to be over the limit.

With reference to FIG. 5, in instances where the memory is full or otherwise not receiving additional packets, the method 300 may proceed to operation 308 and one or more stored packets may be deleted. In particular, the reporter module 204 may analyze the currently queued or stored packets and select the oldest or most stale playback packets for deletion. In particular, the reporter module 204 may operate on a "first in, first out" policy and have a preference for newer packets with more recent data, deleting stale packets. That said, in many instances, the first playback packet of a session, e.g., index value of 1, may not be deleted, regardless of memory storage, to help ensure that the first packet is always transmitted. This allows the server 107 to be able to utilize the additional session metadata included in the first packet to assist in analyzing all additional packets. However, in other embodiments, the first generated playback packet may be deleted, but the session metadata may be transferred or updated to be included in the next oldest or remaining packet(s).

The method 300 may then proceed to operation 310 and the queued playback packets may be uploaded to the server 107 at the designated time, e.g., a predetermined time interval, after selected actions, or as bandwidth allows. In some instances, the packets 210 may be transferred via the HTTP plugin 208 or other data transfer methods. In some instances, the packets 210 may be compressed, such as a zip compression, or the like, before being transferred as well to help reduce the volume of data being transferred over the network 108.

As the playback packets are being uploaded to the server 107, the reporter module 204 may analyze the available bandwidth being utilized by the client device 102 to determine if the bandwidth is sufficient to both stream content to the client device 102 and transfer the queued playback packets to the server 107. For example, in some instances, the reporter module 204 is selected to bandwidth for content streaming, to ensure that the user experience with the content is not impacted by the playback packet transfer. In these instances, the reporter module 204 may analyze the available bandwidth or receive a bandwidth value from the quality module 206 or other heuristic being used to select content quality for download by the player 202.

The reporter module 204 may then compare the determined bandwidth with a threshold value or a state of the player (e.g., buffering) and determine that the bandwidth is problematic, i.e., too low. In this instance, the method 300 may proceed to operation 314 and the current upload of playback packets may be cancelled or paused and the method 300 may return to operation 304. If, however, the bandwidth remains sufficient, the queued playback packets may be uploaded to the server 107. The uploaded packets may be transferred in a variety of formats, including, but not limited to, text files such as JSON files, or the like. Additionally, the formatting of the files may be done to reduce size, e.g., shorter header names, and the like. The playback packets may also be collected together and compressed before transfer, further reducing the bandwidth required to transfer the packets to the server 107.

As the server 107 receives the playback packets 210, the server 107 may analyze the various data contained within the packets to identify trends and performance issues. Because the data in the playback packets 210 is taken directly from the content player 202, but before the content player 202 has modified the data, the data may be considered "raw data" multiple types of metrics and analytics can be run, that may change or be implemented after the data has been collected. For example, as compared to current playback analytics, where the data from the player is modified/summarized before being transferred to the server, newly developed metrics can be applied to historical data. As the server 107 receive the playback packets as streaming is occurring, the sever 107 can generate real time performance displays and graphs that track content playback across the entire platform, e.g., multiple user devices. This allows the server 107 to identify trends in playback problems, more readily and quickly identify CDN overload issues, and improve customer experience. In other words, because the reporter module may collect and transmit the playback packets, independent of any collection done by the content player 202 itself, the server 107 can run any type of clean analytics desired, without having to reformat the data or determine if prior modifications or condensing of the data may have been done locally, such as by the content player 202.

In one example, the playback packet data can be analyzed by the server 107 when providing customer support for a particular customer. For example, the service agent can pull up a particular customer's playback packet history to identify session by session issues and be able to troubleshoot device versus network issues.

The playback packets received by the server 107 can also be used to train quality selection modules, either manually or via machine learning techniques. As another example, the playback packets can be used to determine resolution and/or bitrate of video presented to the user, which can be used to better understand the user experience and make improvements on the streamed content. The playback packets allow the server 107 to estimate the bitrate or resolution. For example, the playback packets 210 may include the URLs for the downloaded fragments, the fragment URL may be standardized such that each fragment URL includes a bitrate and index of the fragment, the playback packet may include the customer's playback position in the content item, then utilizing the playback position and the fragment downloads, the bitrate viewed by the user at a given time can be determined. The determined bitrate can be used to retrieve the content asset profile on the asset manifest to determine the resolution corresponding to the bitrate.

One example of a metric that can be determined by the server 107 utilizing the playback packets 210 include, detecting zero-rebuff ers for a playback session. To determine zero-rebuffer metrics the server 107 may analyze playback events detected and a particular session will be determined to have a zero rebuffer if it has no unexpected rebuffer events, i.e., includes only buffering events due to user action (e.g., seek) and does not include buffering events not caused by user action. For example, the server 107 may use the player state to distinguish expected playback events (e.g., buffering due to the user seeking of fast-forwarding through the content) from unexpected playback events (e.g., buffering due to network issues). Another example of metrics, includes a daily zero rebuffer rate, where the server 107 can determine all the playback sessions overlapping within a predefined interval across a particular location, territory, content asset, or the like, e.g., all playback sessions for the U.S. within a 24 hour period, and analyze those playback sessions for playback events and determine which sessions included zero-rebuffers. Then, the zero-rebuffer value may equal the number of zero-rebuffer sessions divided by the total number of playback sessions over the selected interval or terrorist. As another example, the server 107 may determine all playback sessions overlapping within a predetermined 1 hour interval and then analyze only playback events occurring during that 1 hour period, to determine those playback events with zero rebuffer that occurred during the 1 hour interval or period.

In short, the playback packets 210 received at the server 107 allow the server 107 to generate various types of queries that can be generalized across the platform, content item, time, and/or territory, as well as individualized for specific user experiences. This allows product managers to analyze macro trends in playback performance across selected groups of users, as well as customer service representatives to assist specific users with troubleshooting their devices. Further, real time analytics, such as the form of a real time charting or graphical display, can be displayed that compares and tracks measurable elements of the players across the platform over time.

The playback packets 210 prepared by the reporter module may be more straightforward than conventional metrics used by content players, and therefore easier to implement and reduces the amount of memory and code required to execute.

CONCLUSION

The methods and systems are described herein with reference to live streamed content. However, these techniques are equally applicable to other types of data downloads across a network. Additionally, although the discussions presented herein are discussed with respect to HTTP request, in some instances, the server requests may be done in a different manner and on varying platforms. As such, the discussion of any particular embodiment is meant as illustrative only. Further, features and modules from various embodiments may be substituted freely between other embodiments. To that end, any feature, component, or operation described with respect to one embodiment or example may be used with any other embodiment or example.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for monitoring and correcting playback performance for content players comprising:
   detecting, by a module executing on a user device, a content play request from a media player on the user device, the content player request corresponding to a content item request from a server, wherein the module is separate from the media player;
   generating, by the module, a playback identifier including data corresponding to the content item, the playback identifier associating the content item with a unique playback instance such that the server can uniquely identify the unique playback instance of the media player;
   detecting, by the module, one or more playback events occurring during the unique playback instance of the content by the content player;
   generating, by the module, one or more playback packets including the playback identifier, a packet identifier, and the one or more playback events, the playback packets comprising raw data directly received by the module from the media player, wherein the raw data is neither analyzed nor modified by the user device;
   transmitting, by the module, the one or more playback packets to the server; and
   determining, by the server, one or more analytics based at least in part on the raw data of the one or more playback packets, the one or more analytics associated with a playback performance of the media player, wherein the content item is steamed to the media player independently from the playback packets.

2. The method of claim 1, further comprising determining a player state of the content player, wherein the one or more playback packets include the determined player state.

3. The method of claim 1, wherein generating one or more playback packets includes:

determining that at least one of a threshold of playback events has occurred or a time interval has been reached; and generating a text file corresponding to the playback identifier, packet identifier, and data corresponding to all playback events occurring since a start of the content playback or a last generated playback packet.

4. The method of claim 1, wherein the one or more playback packets are utilized by the server to determine a user experience corresponding to a user associated with the user device.

5. The method of claim 1, wherein generating one or more playback packets is independent of the content player.

6. The method of claim 1, wherein the one or more playback events comprise one or more of:
a state change with the content player;
a playback control change of the content player;
an error with playback of the content by the content player;
a change of a server providing the content to the user device;
a playback metric;
a connection type for a connection of the user device to a network; or
a connection strength for a connection of the user device to a network.

7. The method of claim 1, wherein transmitting the one or more playback packets to the server comprises:
determining that a connection between the user device and the server has sufficient bandwidth; and
transmitting the one or more playback packets to the server based on the sufficient bandwidth.

8. The method of claim 1, wherein the content item request is transmitted to a first server and the one or more playback packets are transmitted to a second of server.

9. The method of claim 8, wherein the first server is part of a content delivery network.

10. The method of claim 1, further comprising:
determining an available bandwidth used by the user device; and
pausing the transmission of the one or more playback packets to the server based at least in part on a comparison of the available bandwidth to a threshold bandwidth, a state of the media player, or a combination thereof.

11. The method of claim 1, further comprising:
determining one or more macro trends in playback performance across groups of users to identify trends in playback problems, identify content distribution network (CDN) overload issues, and improve customer experience based at least in part on the analyzing.

12. The method of claim 1, further comprising:
displaying a real time analytics charting or graphical display based at least in part on the analyzing.

13. The method of claim 1, further comprising:
training one or more quality selection modules using the one or more playback packets; and
determining a resolution, a bitrate, or a combination thereof using the one or more playback packets.

14. A content tracking system to detect content play issues comprising:
a content player on a user device in electronic communication with a content delivery server; and
a reporter module separate from the content player in electronic communication with the content player and a control server, wherein the reporter module:
generates a session identifier in response to the content player requesting a first content item for display;
generates a first set of playback events in response to one or more playback events occurring during a first time period of a unique playback instance of the first content item;
generates a first playback identifier corresponding to the first time period, the playback identifier associating the content item with the unique playback instance such that the server can uniquely identify the unique playback instance of the content player;
transmits a first playback packet to a server, the first playback packet including the session identifier, the first set of playback events, and the first playback identifier, the first playback packet comprising raw data directly received from the media player, wherein the raw data is neither analyzed nor modified by the user device, wherein:
the content delivery server is configured to determine one or more analytics based at least in part on the raw data of the one or more playback packets, the one or more analytics being associated with a playback performance of the media player; and
the first playback packet is transmitted separately from the first content item.

15. The content tracking system of claim 14, wherein the reporter module further determines a state of the content player at a beginning of the first time period and includes the state in the first playback packet.

16. The content tracking system of claim 14, wherein the reporter module further determines a session metadata describing the first content item and a user associated with the content player, wherein the first playback packet includes the session metadata.

17. The content tracking system of claim 16, wherein the reporter module:
generates a second set of playback events in response to one or more playback events occurring during a second time period of the unique playback of the first content item;
generates a second playback identifier corresponding to the second time period; and
transmits a second playback packet to the server, the second playback packet including the session identifier, the second set of playback events, and the second playback identifier.

18. The content tracking system of claim 14, the first set of playback events comprise one or more of:
a state change with the content player;
a playback control change of the content player;
an error with playback of the content by the content player;
a change of a server providing the content to the content player;
a playback metric;
a connection type for a connection of the user device to a network; or
a connection strength for a connection of the user device to a network.

19. The content tracking system of claim 14, wherein the content player is an adaptive bitrate player.

20. The content tracking system of claim 14, wherein the content player is independent of the reporter module.

* * * * *